US007003519B1

(12) United States Patent
Biettron et al.

(10) Patent No.: US 7,003,519 B1
(45) Date of Patent: Feb. 21, 2006

(54) METHOD OF THEMATIC CLASSIFICATION OF DOCUMENTS, THEMETIC CLASSIFICATION MODULE, AND SEARCH ENGINE INCORPORATING SUCH A MODULE

(75) Inventors: Laurent Biettron, Lannion (FR); Frédéric Pallu, Trebeurden (FR); Sylvie Tricot, Tredrez (FR)

(73) Assignee: France Telecom, Paris (FR)

( * ) Notice: Subject to any disclaimer, the term of this patent is extended or adjusted under 35 U.S.C. 154(b) by 299 days.

(21) Appl. No.: 10/088,895

(22) PCT Filed: Sep. 22, 2000

(86) PCT No.: PCT/FR00/02640

§ 371 (c)(1),
(2), (4) Date: Aug. 23, 2002

(87) PCT Pub. No.: WO01/22279

PCT Pub. Date: Mar. 29, 2001

(30) Foreign Application Priority Data

Sep. 24, 1999 (FR) .................................. 99 11973

(51) Int. Cl.
*G06F 17/30* (2006.01)

(52) U.S. Cl. .................................. 707/6; 707/3; 707/7
(58) Field of Classification Search ................... 707/5, 707/7, 6, 3
See application file for complete search history.

(56) References Cited

U.S. PATENT DOCUMENTS 5,625,767 A  4/1997  Bartell et al. ............... 345/440

FOREIGN PATENT DOCUMENTS

EP  0 822 503 A1  2/1998
WO  WO 97/38382  10/1997 ................ 382/181

OTHER PUBLICATIONS

Wilbur et al.; "An analysis of statistical term strength and its use in the indexing and retrieval of molecular biology texts"; Journal title "Computers in Biology and Medicine"; 1996; Pergamon; vol. 26, Issue 3 ISSN 0010-4825; pp. 209-222.*
Salton, Gerard; "Automatic Information Organization and Rerieval"; 1968; McGraw-Hill Book Company; pp. 133-150.*
Salton, Gerard; "Developments in Automatic Text Retrieval"; Aug. 1991; Science, vol. 253; pp. 974-979.*
Salton, Gerard; "Automatic Text Processing—The Transformation, Analysis, and Retrieval of Information by Computer"; 1989; Addison-Wesley Publishing Company; pp. 326-341.*

(Continued)

*Primary Examiner*—Luke S Wassum
*Assistant Examiner*—Gwen Liang
(74) *Attorney, Agent, or Firm*—Young & Thompson

(57) ABSTRACT

A method of thematically classifying documents, in particular for making up or updating thematic databases (42) for a search engine, includes the steps of selecting documents representative of each theme, identifying within the selected documents, elements that are characteristic of each theme, allocating a coefficient (R) to each identified element, said coefficient being representative of the relevance of said element relative to the corresponding theme, and for each document (50) for classification, identifying said elements characteristic of each theme contained in the document and, for each theme corresponding thereto, using the coefficients allocated to said elements to calculate the value of a characteristic representative of the relevance of the theme for the document (50), in order to decide whether or not the document relates to the theme.

13 Claims, 3 Drawing Sheets

OTHER PUBLICATIONS

Jo, C.; "News Article Classification based on Categorical Points from Keywords in Backdata"; Feb. 1999; Concurrent Systems Engineering Series vol. 56; pp. 211-214.*

XP-002141634, Chekuri et al., "Web Search using Automatic Classification", 1997.

XP-002141635, The VLDB Journal, Chakrabarti et al., "Scalable Feature Selection, Classification and Signature Generation for Organizing Large Text Databases into Hierarchical Topic Taxonnomies", 1998, pp. 163-178.

* cited by examiner

METHOD OF THEMATIC CLASSIFICATION OF DOCUMENTS, THEMETIC CLASSIFICATION MODULE, AND SEARCH ENGINE INCORPORATING SUCH A MODULE

BACKGROUND OF THE INVENTION

The present invention relates to a method of thematically classifying documents and intended in particular for setting up or updating thematic databases, in particular for a search engine.

The invention also relates to a module for thematically classifying documents, and to a search ine fitted with such a thematic classification module.

At present, two main computer tools are known for searching documents on a computer network such as the Internet, for example.

These tools are search engines and guides.

A search engine is a tool that serves to extract the words or terms that are most representative of information, mainly in the form of text, and to store them in a database, also known as an "index" base.

Such index bases are generally updated relatively frequently.

In response to a request made by a user, the same tool scans through the index bases in order to identify the terms which are most relevant relative to those of the request, and then to sort the information obtained in return.

The other technique for searching for documents on a computer network consists in using a guide. That tool proposes searches by category, with document pages being classified manually by researchers.

Those types of tool present various drawbacks.

Firstly, search engines do not propose classifying document pages by category. The pages provided in response to a request are not typified. Thus, ambiguous requests can give rise to a very wide variety of responses that are perceived by the user as noise.

In contrast, guides provide a user with responses that are typified, i.e. that relate to the same theme(s) as the request.

Another method described in document U.S. Pat. No. 5,625,767 enables thematic classification to be performed on the basis of a statistical analysis of the document. However, that method requires the documents to be manually classified beforehand.

The object of the invention is to mitigate the drawbacks of search engines and of guides.

SUMMARY OF THE INVENTION

The invention thus provides a method of thematically classifying documents, in particular for making up or updating thematic databases for a search engine, the method being characterized in that it comprises the following steps:
selecting a sample of documents representative of each theme;
identifying within the selected documents elements that are characteristic of each theme;
allocating a coefficient to each identified element, which coefficient is representative of the relevance of said element relative to the corresponding theme;
downloading documents from a computer network;
for each downloaded document to be classified, identifying said theme-characterizing elements that are contained in the document for each of the themes, and for each theme corresponding to the documents, using the coefficients allocated to said elements to calculate a characteristic value representative of the relevance of that theme for the document in order to decide whether or not the document relates to the theme, said theme-characterizing elements identification and calculation steps being performed automatically for each document downloaded from the computer network;
classifying the downloaded documents as a function of the themes with which they deal; and
storing the documents classified thematically in databases that can be interrogated on the basis of themes contained in a request;
and in that the step of allocating said coefficient to each identified element comprises the following steps for each theme:
calculating a frequency of the element in the selected documents relating to the theme;
calculating a frequency of the element in the selected documents that do not relate to the theme; and
calculating the ratio of the calculated frequencies.

The documents downloaded from a computer network are thus classified as a function of the themes dealt with therein, and this is done automatically.

The classification method of the invention can also include one or more of the following characteristics, taken singly or in any technically feasible combination:
it further comprises the step of sorting themes in a theme tree structure in decreasing order of coefficients;
the step of calculating the characteristic representative of the relevance of the theme of a document for classification comprises the following steps, for each theme:
reading the value of the ratio of said frequencies for each theme-representing element extracted from the document;
multiplying together the values as read; and
allocating the result of this multiplication to the value of said characteristic;
deciding that the document relates to a theme if the value of said characteristic representative of the relevance of the theme for said document is greater than a threshold value;
determining the threshold value for each theme on the basis of said frequency ratios using the following relationship:

$$\text{score-threshold}_{theme} = (R_{mean})\text{theme\_n}$$

in which:
score-threshold$_{theme}$ designates the threshold value;
$R_{mean}$ represents the mean value of the frequency ratios R of the elements of the theme; and
theme_n designates a predetermined number;
in a variant, adjusting the threshold value manually;
performing the steps of identifying theme-characterizing elements contained in a document for each theme by means of a hashing table; and
for each vocabulary element of a request formulated by a user, calculating coefficients characteristic of the element relative to each known theme, and associating each element with the corresponding themes and coefficients, so that said coefficients reach a minimum value.

When searching index entries, i.e. while searching for documents that correspond to the request, it is also possible directly to access the themes associated with each element and the corresponding coefficients which are combined by multiplication in order to determine a classification of themes associated with the entire request.

The invention also provides a module for thematically classifying documents, in particular for a search engine, the module being characterized in that it comprises a central processor unit having means for comparing elements extracted from each document with elements characteristic of various themes, each element being allocated a coefficient representative of the relevance of said element for a corresponding theme, and means for calculating a characteristic value representative of the relevance of a theme for the document on the basis of the coefficients of said characteristic elements that the document contains, in order to decide whether or not the document relates to said theme, said central unit being connected to means for storing documents classified by theme that can be interrogated on the basis of themes contained in a request, and in that the module has means for calculating the frequency of the element in the selected documents relating to the theme, means for calculating the frequency of the element in the selected documents that do not relate to the theme, and means for calculating the ratio between the calculated frequencies.

The invention also provides a search engine for documents on a computer network, the engine comprising an indexing module for creating and updating thematic databases on the basis of documents downloaded from the computer network, and a module for interrogating thematic databases adapted to supply the references of documents corresponding to a request that has been input thereto, the search engine being characterized in that it further comprises a thematic classification module as defined above associated with the indexing module.

BRIEF DESCRIPTION OF THE DRAWINGS

Other characteristics and advantages appear from the following description given purely by way of example and made with reference to the accompanying drawings, in which.

DESCRIPTION OF THE PREFERRED EMBODIMENTS

Figure 1:
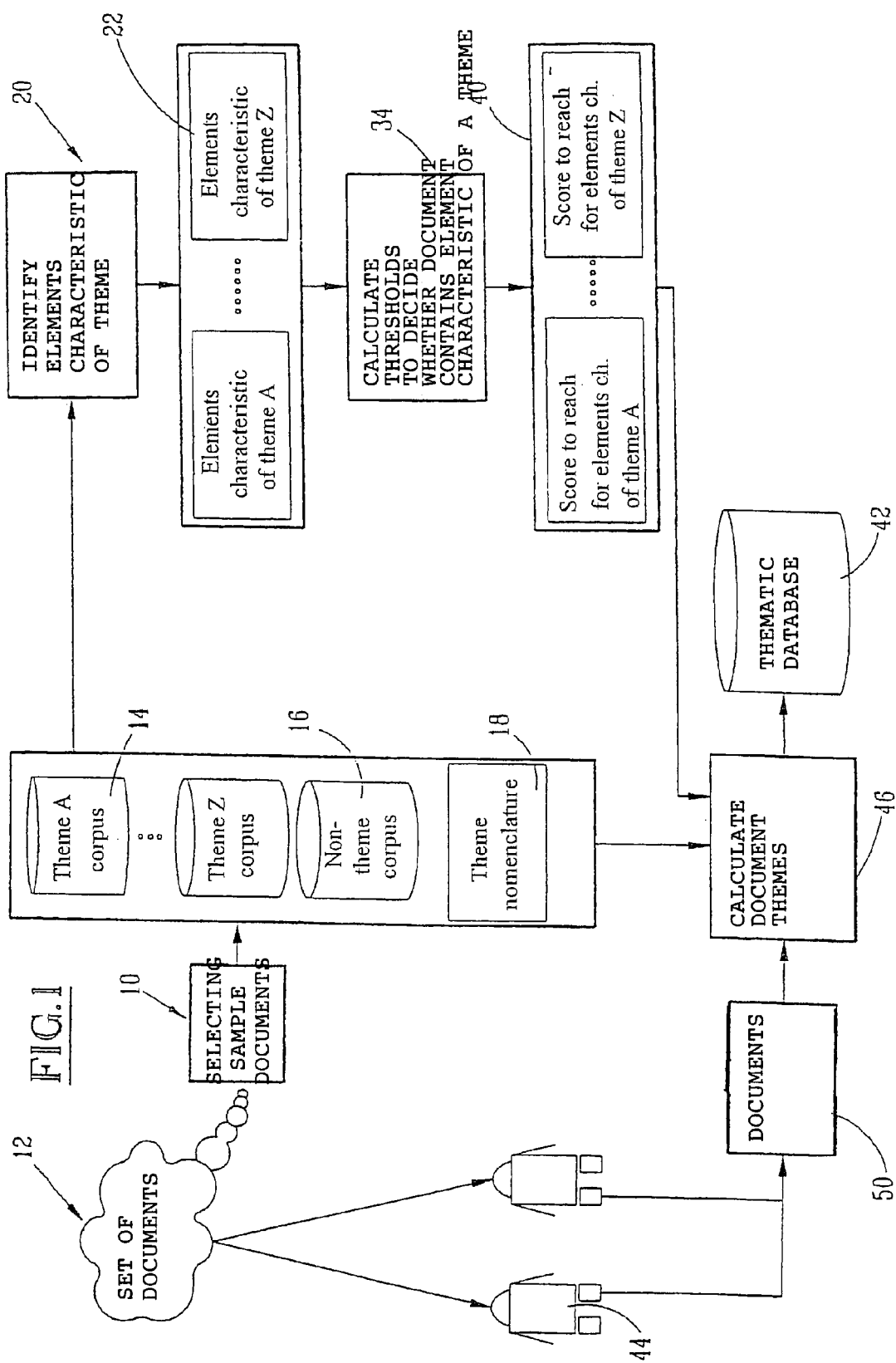
FIG. 1 is a flow chart showing the main operating stages of a module of the invention for thematically classifying documents for a search engine.

FIG. 1 shows the main stages of the method of the invention for thematically classifying documents.

It is intended to enable documents downloaded from a computer network to be classified as a function of the themes they deal with. For example, it can be implemented within a search engine.

Under such circumstances, it is involved in the indexing process, and also during processing of a request formulated by a user so as to determine all of the themes dealt with in the request.

Nevertheless, it will be understood that other applications can be envisaged. For example, the method can be implemented at a network access point for stations using an Internet network in order to determine the nature of the web pages downloaded by the users and to filter requests in order to authorize or ban certain themes, for example themes contrary to ordre public or morals, or indeed to calculate statistics concerning uses' centers of interest.

To proceed with this classification, the method comprises two distinct stages, namely: a prior first stage of acquiring the thematic vocabulary of the corpus of documents and of giving each word of the vocabulary a threshold value above which it is decided that a document containing this word relates to the corresponding theme; and also a second stage of classification proper, during which a document downloaded from the network is automatically classified as a function of the characteristic elements it contains.

By way of example, this second stage takes place periodically, and only documents that have been newly created or modified are classified.

The first stage of thematic vocabulary acquisition is described below with reference to FIGS. 1 to 3.

As can be seen in FIG. 1, this stage starts with a manual selection step 10 from a set 12 of samples (or "corpus") of documents that are representative of each of themes A to Z used for classifying documents during the second stage.

Thus, at the end of this manual selection step 10, a set of document corpuses such as 14 is available with each corpus relating to a particular theme (theme A, theme Z). Naturally, the selection step can equally well be performed by any means other than manual.

During this selection step 10, a corpus 16 is also created of documents that do not relate to any of the themes A to Z, and a nomenclature 18 for the themes A to Z is defined, i.e. a list of said themes associated with subthemes relating thereto.

During the following step 20, these elements are input to a thematic classification module in order to extract from each document elements that are characteristic of each theme and to give each of them a coefficient representative of its relevance relative to a corresponding theme.

By way of example, this thematic classification module is in the form of a specific module of a search engine associated with an indexing module that creates or updates thematic databases.

It can also be implemented in the form of a specific module provided at an access point to a computer network, in particular an Internet network.

The module has software means suitable for extracting elements that are characteristic of each theme and for allocating respective coefficients representative of their relevance relative to the various themes, as described in detail below.

During this step 20, the classification module extracts the elements characteristic of each theme from each of the selected documents.

This extraction is performed using a computer tool of conventional type. It is therefore not described below.

At the end of this step 20, lists are available of elements that are characteristic of the themes A to Z, such as the lists 22.

Figure 2:
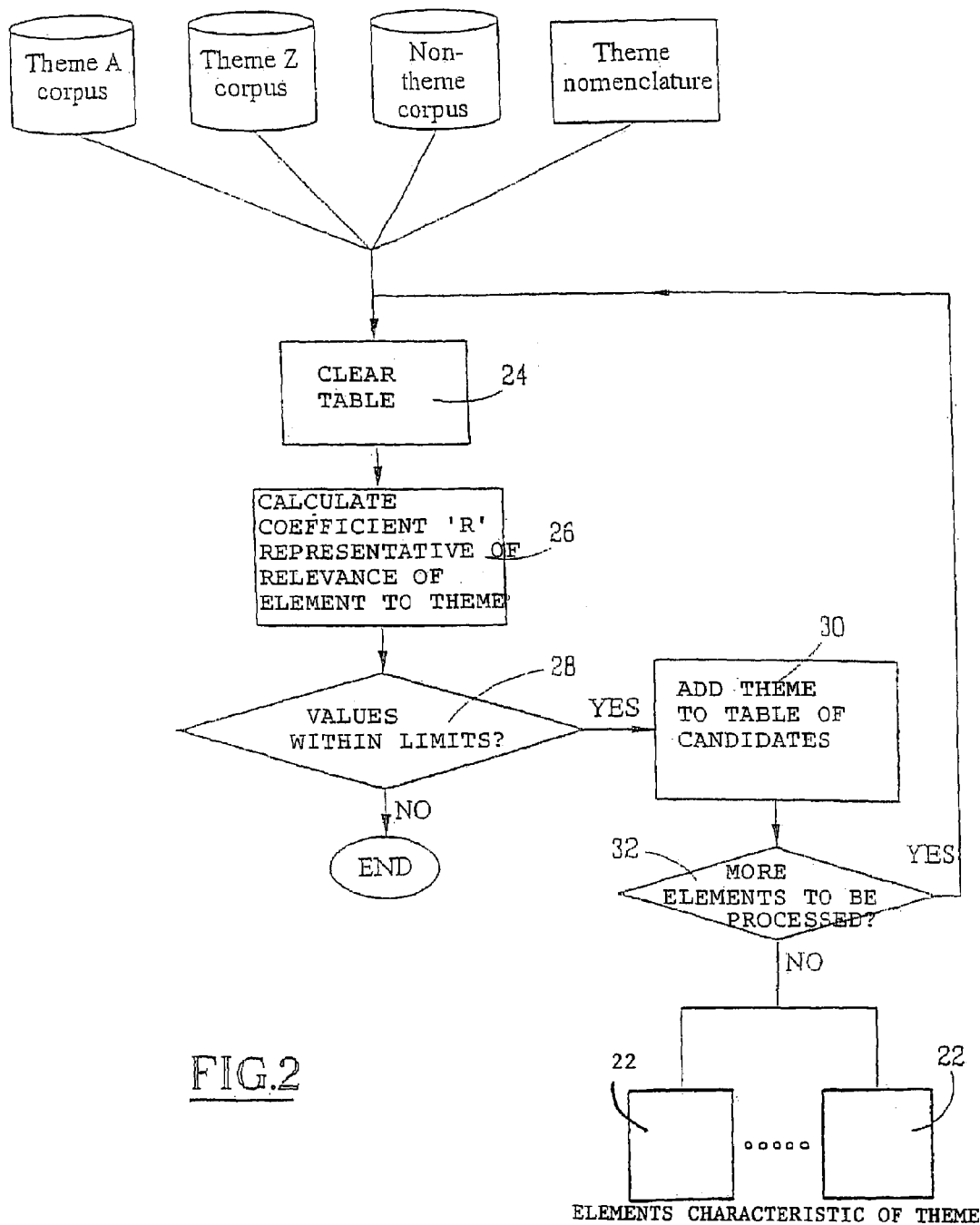
FIG. 2 is a flow chart showing the method of calculating the elements characteristic of themes.

With reference to FIG. 2, this procedure of identifying the vocabulary that is characteristic of each theme is performed successively for each element extracted from the documents in each of the corpuses 14 and 16.

During a first step 24, a table of all candidate themes is cleared, i.e. a table of all themes that might correspond to an extracted element.

During the following step 26, a coefficient R is calculated for each theme, where the coefficient R is representative of the relevance of the element relative to the theme.

To proceed with this calculation, the frequency p of the element in the documents relating to the theme is initially calculated, and so is the frequency Q of the same element in the documents that do not relate to the theme.

Thereafter the coefficient R is calculated which is constituted by the ratio of the frequencies p and q.

During the following step 28, a check is made to verify that the characteristics p, q, and R lie within predetermined limits.

If this is not the case, then the following element is processed.

If this is the case, then the theme is added to the table of candidate themes with a score equal to the coefficient R (step 30).

If any elements remain to be processed (step 32) then the procedure returns to preceding step 24.

Otherwise the procedure ends.

It will be observed that after the table of candidate themes has been filled it is preferably sorted by decreasing order of the scores R. It should also be observed that for each candidate theme, and up to some desired maximum number, a new element taken from the list of elements characteristic of said theme is added while remaining within the limit of a desired maximum number of the n best elements per theme selected as a function of their respective scores R.

With reference once more to FIG. 1, during the following step 34, the thematic classification module proceeds by means of an appropriate algorithm automatically to calculate a threshold value corresponding to a minimum threshold to be reached in order to decide that a document containing an element characteristic of a theme does or does not relate to the theme.

To perform this calculation, the classification module begins by calculating the mean value $R_{mean}$ of the ratios R of the characteristic elements of each theme.

Thereafter, it calculates the threshold value score-threshold$_{theme}$ using the following relationship:

$$\text{score-threshold}_{theme} = (R_{mean}) \text{theme\_}n$$

where theme_n designates a predetermined number which is selected to be equal to 5, for example, for most themes.

It can thus be seen in FIG. 1 that after automatically calculating the scores to be reached, lists of elements that are characteristic of each of the themes A to Z are made available, such as the list 40, with each element being associated with a score to be reached, i.e. a threshold value beyond which it is considered that a document relates to the theme.

After this stage of acquiring thematic vocabulary, implemented using a corpus of documents representative of various themes, the second stage of thematic classification proper can be performed in order to make up thematic databases given overall numerical reference 42 from documents 50 collected automatically from the computer network by robots such as 44.

These documents 50 are input to the thematic classification module which also receives an indication of the theme nomenclature 18 and the elements available from the outcome of above-mentioned step 34. This module proceeds automatically to calculate the themes on which a document relates (step 46).

To do this, it has all of the software means required for implementing the above-mentioned operations.

Figure 3:
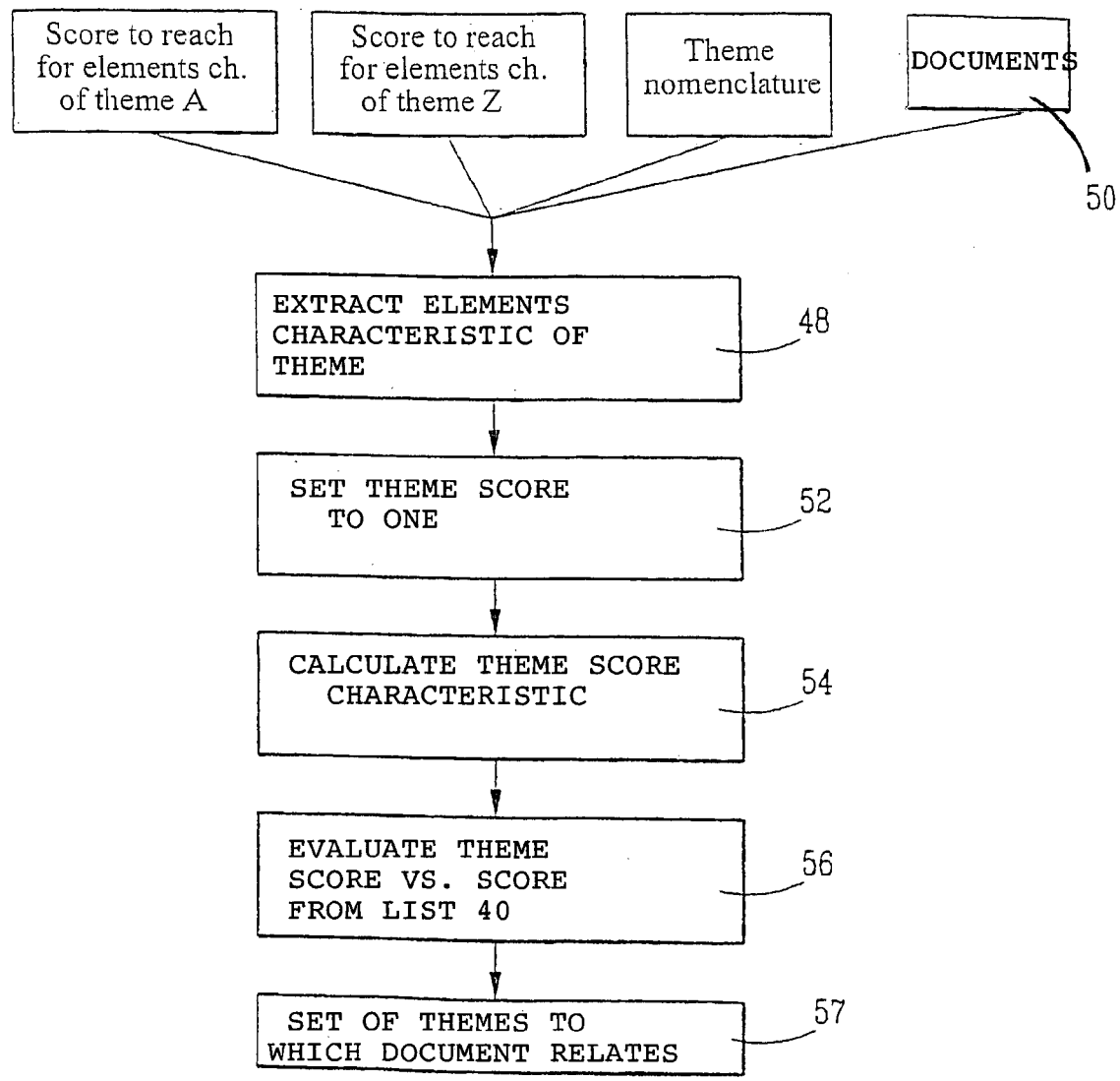
FIG. 3 is a flow chart showing the method of calculating the themes of a document.

With reference to FIG. 3, at the end of a first step 48 of this procedure, the indexing module extracts from each document 50 downloaded by the robots 44 those elements that are characteristic of the themes it contains.

By way of example, this step is performed by using a hashing table to search quickly through the lists of characteristic elements for the elements contained in each document.

After these elements have been extracted, the elements characteristic of the themes contained in the list 40 are identified from amongst them.

For each identified element, the classification module then calculates a characteristic value representative of the relevance of each theme for the document, on the basis of the coefficients given to the element.

To do this, during the following step 52, a variable "theme_score", representative of the score of the document in a given theme is set at 1, and this is done for all of the themes.

Thereafter, for each element of the document, and for each theme in the tree structure of themes, if the element lies within the list of elements characteristic of the theme, then the score R is read, i.e. the value of the frequency ratio for each element, and the values read for the score R for each of the elements are multiplied together.

The result of this multiplication is then used as the value for the theme_score characteristic (step 54).

It is then decided that the themes recognized in document 50 are those for which the theme_score characteristic reaches or exceeds the score that is to be reached for these themes (step 56).

Thus, at the end of this procedure, a set 57 of themes is available to which the downloaded document 50 relates.

It will be understood that this procedure for automatically calculating the themes of documents 50 downloaded by the robots 44 enables the indexing module of a search engine to classify these documents as a function of the themes dealt with and to build up the thematic databases 42.

Such a procedure for automatically calculating document themes can also be used for determining which themes are dealt with in requests made by users.

To do this, starting from a request, for each of the elements of the interrogation vocabulary used in the request, the coefficients characteristic of said element relative to each of the known themes are calculated and each of these elements is associated with the coefficients and themes in such a manner that the coefficients reach a minimum value.

When searching for index entries corresponding to the elements of a request, i.e. in order to calculate the results, it is thus possible to access directly the theme which is associated with the elements and also their coefficients, and these are combined by multiplication using the same procedure as that described above in order to classify the themes associated with the request as a whole.

It can thus be understood that this procedure makes it possible to ask a user to refine a request, for example when the request is formulated in vague manner.

It will also be understood that this procedure which enables the themes contained in a request to be identified makes it possible to monitor user requests in order to establish statistics for defining user profiles as a function of requests.

It will thus be understood that the invention as described above can be used for searching for themes contained in pages downloaded from a computer network, for determining the themes contained in a request formulated by a user, and on the basis of such determination, for filtering requests and also downloaded pages in order to ban the formulation of requests or the downloading of pages relating to predetermined banned themes, and also to generate user profiles.

Nevertheless, it should be observed that in the context of determining themes contained in a request, the request is considered as constituting a document input to the thematic classification module of the invention.

The invention is not limited to the implementation described.

In a variant, it is also possible manually to adjust the value of the threshold from which it is decided that a document does or does not bear on a given theme.

What is claimed is:

1. A method of thematically classifying documents, in particular for making up or updating thematic databases for a search engine, the method comprising the following steps:

manually and/or automatically selecting a sample of documents representative of each theme;

automatically identifying within the selected documents elements that are characteristic of each said theme;

automatically allocating a coefficient to each identified element, wherein said coefficient is representative of a relevance of said element to a corresponding theme;

downloading documents from a computer network;

for each downloaded document to be classified, identifying said theme-characterizing elements that are contained in the document for each said theme, and for each theme corresponding to the elements, using the coefficients allocated to said elements to calculate a characteristic value representative of the relevance of that theme for the document, in order to decide whether or not the document relates to the theme, said theme—characterizing elements identification and calculation steps being performed automatically for each document downloaded from the computer network;

automatically classifying the downloaded documents as a function of themes with which they deal;

automatically storing the documents classified thematically in databases that can be interrogated on the basis of themes contained in a request; and making the databases available to users who interrogate the databases on the basis of themes contained in a request;

and the step of allocating said coefficient to each identified element comprises the following steps for each theme:

automatically calculating a frequency of the element in the selected documents relating to the theme;

automatically calculating a frequency of the element in the selected documents that do not relate to the theme; and automatically calculating a ratio of the calculated frequencies of the theme-related element and of the non-theme-related element.

2. A method according to claim 1, further comprising the step of automatically sorting themes in a theme tree structure in decreasing order of coefficients.

3. A method according to claim 1, wherein the step of automatically calculating the characteristic value representative of the relevance of the theme of a document for classification comprises the following steps, for each theme:

reading the value of the ratio of said frequencies for each theme-representing element extracted from the document;

multiplying together the values of the ratios as read for the theme-characterizing elements; and allocating the result of the multiplication to the characteristic value.

4. A method according to claim 1, wherein it is automatically decided that the document relates to a theme if the characteristic value of representative of the relevance of the theme for said document is greater than a threshold value.

5. A method according to claim 4, wherein the threshold value for each theme is automatically determined on the basis of the frequency ratio using the following relationship:

$$\text{score-threshold}_{theme} = (R_{mean})\text{theme } n$$

in which:

score–threshold$_{theme}$ designates the threshold value;

$R_{mean}$ represents the mean value of frequency ratios R of the elements of the theme; and theme –n designates a predetermined number.

6. A method according to claim 4, wherein the threshold value is adjusted manually.

7. A method according to claim 1, wherein the steps of automatically identifying theme-characterizing elements contained in a document and for each theme are performed by means of a hashing table.

8. A method according to claim 1, wherein for each vocabulary element of a request formulated by a user, coefficients are automatically calculated that are characteristic of the element relative to each known theme, and each element is associated with the corresponding themes and coefficients, so that said coefficients reach a minimum value.

9. A module for thematically classifying documents, in particular for a search engine, the module comprising a central processor unit having means for comparing elements extracted from each document with elements characteristic of various themes, each element being allocated a coefficient representative of a relevance of said element for a corresponding theme, and means for calculating a characteristic value representative of the relevance of a theme for the document on the basis of the coefficients of said characteristic elements that the document contains, in order to decide whether or not the document relates to said theme, said central processor unit being coupled to means for storing documents classified by theme that can be interrogated on the basis of themes contained in a request, and the module has means for calculating a frequency of the element in the documents relating to the theme, means for calculating a frequency of the element in the documents that do not relate to the theme, and means for calculating a ratio between the calculated frequencies of the theme-related element and of the non-theme-related element.

10. A method of classifying documents comprising the steps of providing the module of claim 9, and using said module to determine which themes are contained in a request formulated by a user.

11. A method of for thematically classifying documents comprising the steps of providing the module of claim 9, using said module for determining which themes are contained in pages downloaded from a computer network or in a request formulated by a user, and filtering downloaded documents to ban consultation of pages relating to one or more predetermined themes.

12. A method of thematically classifying documents comprising the steps of providing the module of to claim 9, using said module to determine which themes are contained in a request formulated by a user, and generating user profiles on the basis of the themes to which the request relates.

13. A search engine for documents on a computer network, the engine comprising an indexing module for creating and updating thematic databases on the basis of documents downloaded from the computer network, and a module for interrogating thematic databases adapted to supply references of documents corresponding to a request that has been input thereto, the search engine further comprising a thematic classification module according to claim 9 associated with the indexing module.

* * * * *